United States Patent
Gale et al.

(10) Patent No.: US 7,512,893 B2
(45) Date of Patent: Mar. 31, 2009

(54) SYSTEM, A METHOD AND A COMPUTER PROGRAM FOR TRANSMITTING AN INPUT STREAM

(75) Inventors: Martin J. Gale, Eastleigh (GB); Andrew James Bravery, Salisbury (GB); John Frederick Clarke, Oxford (GB)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 11/363,117

(22) Filed: Feb. 27, 2006

(65) Prior Publication Data

US 2006/0195795 A1  Aug. 31, 2006

(30) Foreign Application Priority Data

Feb. 25, 2005  (GB) ................................. 0503880.7

(51) Int. Cl.
*G06F 13/00* (2006.01)
*G06F 15/00* (2006.01)
(52) U.S. Cl. ...................................... 715/767; 715/853
(58) Field of Classification Search ......... 715/767–769, 715/805, 864, 853–854, 810, 840, 763
See application file for complete search history.

(56) References Cited

U.S. PATENT DOCUMENTS

| | | | |
|---|---|---|---|
| 2004/0199499 A1* | 10/2004 | Lazaridis et al. | 707/3 |
| 2005/0114783 A1* | 5/2005 | Szeto | 715/747 |
| 2006/0095779 A9* | 5/2006 | Bhat et al. | 713/182 |

* cited by examiner

*Primary Examiner*—Kevin Nguyen
(74) *Attorney, Agent, or Firm*—Lee Law, PLLC; Christopher B. Lee

(57) ABSTRACT

A system for transmitting an input stream for use with an apparatus comprising a plurality of entities (e.g. applications, processes etc.) wherein each entity comprises an associated entity profile having associated profile data. The system comprises: a focus component for detecting focus of a first entity and an intercept component for intercepting the input stream having input data, before the input stream is input to the focused first entity. A match component matches the input data with first profile data of a first entity profile associated with the focused first entity. In response to the input data not matching the first profile data, the match component matches the input data with second profile data of a second entity profile associated with a second entity. In response to the input data matching the second profile data, the input stream is transmitted to the second entity.

17 Claims, 5 Drawing Sheets

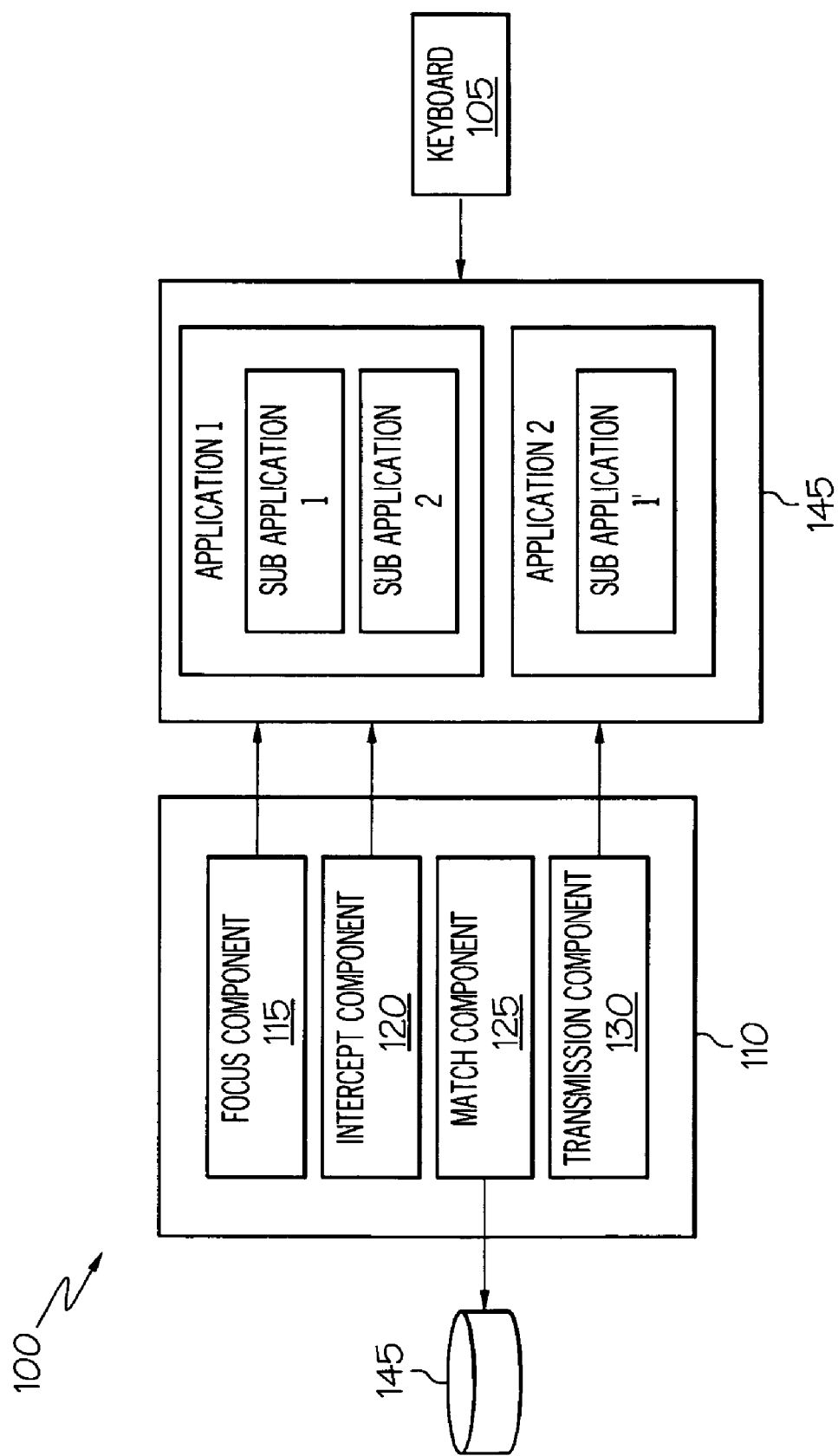

SYSTEM, A METHOD AND A COMPUTER PROGRAM FOR TRANSMITTING AN INPUT STREAM

BACKGROUND OF THE INVENTION

The present invention pertains to computers and other data processing systems, software and processes and, more particularly, to such a system, program and process for transmitting an input stream.

In a graphical user interface (GUI), applications, processes and data are generally presented as entities depicted on a user interface. Applications include, for example, text editors, databases, file managers, e-mail and instant massaging.

In GUI environments, it is often the case that a user has many entities running concurrently, wherein the entities are depicted as a set of "windows". Advantageously, the user is able to interact with several separate entities via a single GUI. However, a user can also become disorientated as to which object is depicted by which window.

For example, instant massaging applications invoke a separate window for each conversation thread and the "look and feel" of these windows can appear almost identical to the user. This is disadvantageous, because the user can inadvertently send a message to an incorrect recipient, which can cause disclosure of inappropriate (e.g. confidential or personal) information.

An added complication is that a number of applications seize focus from a current object that a user is working with without warning to the user, for example, Interned sites have pop-up windows displaying advertisements, forms etc. Thus, a user can inadvertently send input to an incorrect object.

A current solution to this problem is a retrieval mechanism (e.g. used in some e-mail systems) that retrieves an input message that has been sent by a user, but that is yet to be sent to the recipient. However, with this mechanism, the onus is on the sender to notice that a message is to be sent to an incorrect recipient and also to invoke the retrieval mechanism. Another solution is to customize entities in order to distinguish between the entities. For example, each window in a set of windows can be customized to have a different color, different font etc.) However, this is not a fail-safe solution as a user can still inadvertently transmit input to an incorrect recipient and furthermore, this solution requires the user to make sense of the various customization.

SUMMARY OF THE INVENTION

According to a first aspect, there is provided a system for transmitting an input stream for use with an apparatus comprising a plurality of entities, wherein each entity comprises an associated entity profile having associated profile data, the system comprising: a focus component for detecting focus of a first entity; an intercept component for intercepting the input stream having input data, before the input stream is input to the focused first entity; a match component for matching the input data with first profile data of a first entity profile associated with the focused first entity and in response to the input data not matching the first profile data, matching by the match component, the input data with second profile data of a second entity profile associated with a second entity; and a transmission component, responsive to the input data matching the second profile data, for transmitting the input stream to the second entity.

Preferably, an entity profile is generated from one or more input streams input to the associated entity. More preferably, the profile data comprises alphanumeric characters and the input data comprises alphanumeric characters. Still more preferably, each entity of the plurality of entities comprises associated entity data (e.g. an identifier).

In a preferred embodiment, the focus component obtains entity data and passes the obtained entity data to the intercept component. Preferably, the match component uses entity data associated with an entity, to find an entity profile. More preferably, the intercept component stores the input stream in a storage means and passes the input stream to the match component.

In a first embodiment, a user can select an alternative entity to a currently focused entity, to which an input stream is transmitted to. Preferably, the transmission component transmits, before transmitting the input stream to the second entity, a notification to an administrator comprising an option associated with selection of the second entity. In, response to receiving a selection of the second entity, the transmission component transmits the input stream to the second entity.

In a second embodiment, automated selection of an alternative entity to a currently focused entity, to which an input stream is transmitted to, occurs. Preferably, a count component, responsive to the input data matching the second profile data, counts a number of sets of input data that match corresponding sets of second profile data. More preferably, a comparator compares a value of the number with a threshold. Still more preferably, the transmission component transmits the input stream to the second entity if the threshold is met.

Thus, focus of an entity is detected and an input stream to be transmitted to the focused entity is intercepted before it is transmitted to the focused entity. The intercepted input stream is passed to a match component, so that input data in the input stream can be matched to profile data of a profile associated with the focused entity. If a match does not occur, the input data can be matched to profile data of one or more profiles associated with other entities. If a match occurs, the input stream is transmitted to the other entity.

According to a second aspect, the present invention provides a method of transmitting an input stream for use with an apparatus comprising a plurality of entities, wherein each entity comprises an associated entity profile having associated profile data, the method comprising the steps of: detecting focus of a first entity; intercepting the input stream having input data, before the input stream is input to the focused first entity; matching the input data with first profile data of a first entity profile associated with the focused first entity and in response to the input data not matching the first profile data, matching, the input data with second profile data of a second entity profile associated with a second entity; and in response to the input data matching the second profile data, transmitting the input stream to the second entity.

According to a third aspect, the present invention provides a computer program comprising program code means adapted to perform all the steps of the method described above.

BRIEF DESCRIPTION OF THE DRAWINGS

The present invention will now be described, by way of example only, with reference to preferred embodiments thereof, as illustrated in the following drawings:

FIG. 1. is a schematic diagram of a data processing system in which the present invention may be implemented;

DESCRIPTION OF THE PREFERRED EMBODIMENTS

Figure 2A:
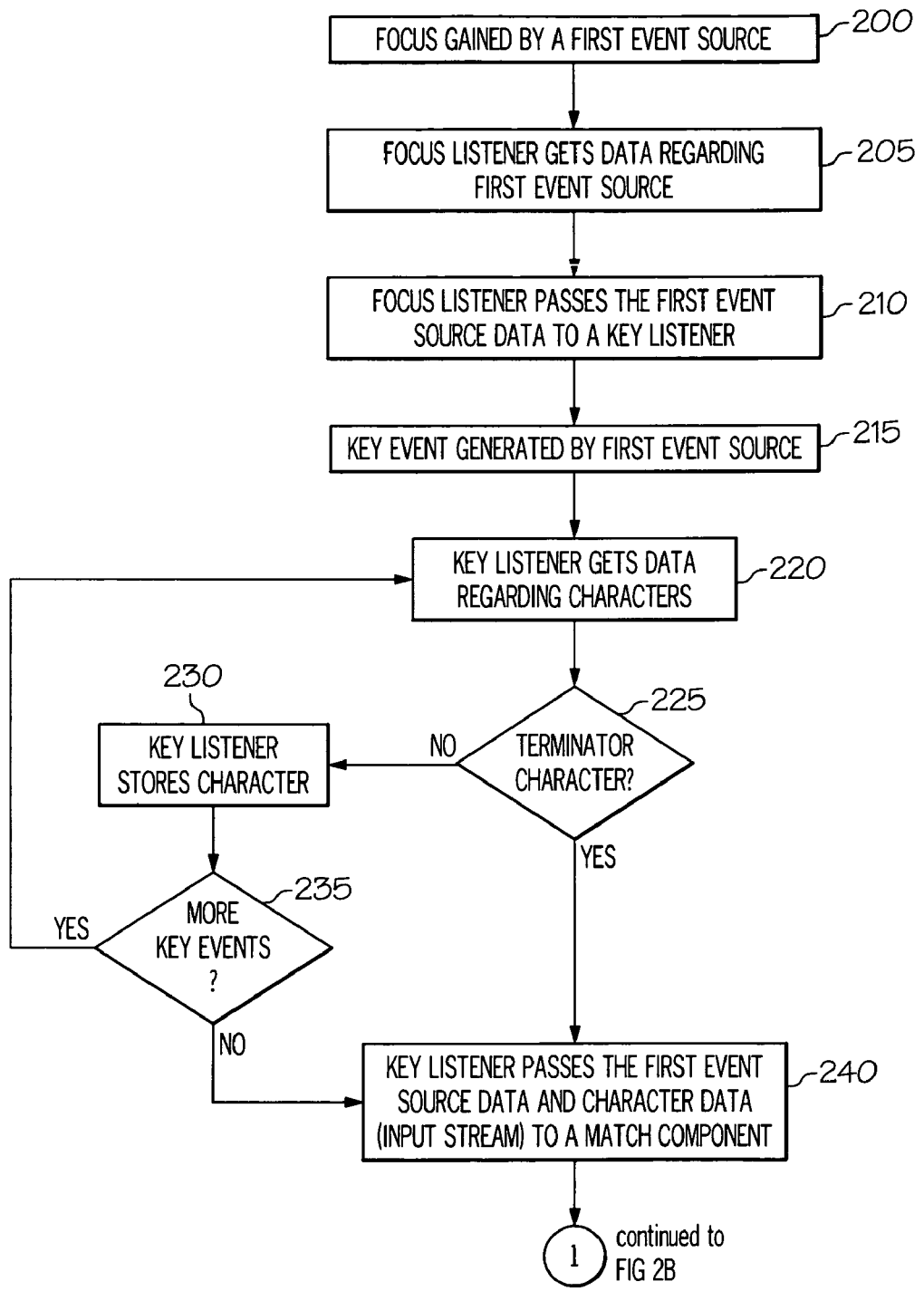
FIG. 2 is a flow chart showing the operational steps involved in a process of a first embodiment.

A system (100) in which the present invention may be implemented is shown in FIG. 1. The system (100) comprises an input device (105) (e.g. a keyboard) that a user uses to input an input stream comprising input data to one or more entities (e.g. windows representing applications, sub-applications, processes etc.). The input data comprises alphanumeric characters, for example, textual data comprising words, terms etc.

The system (100) also comprises a computer system (145), wherein two applications (i.e. Application 1 and Application 2) are running. Application 1 comprises two sub-applications (i.e. Sub-application 1 and Sub-application 2). Application 2 comprises one sub-application (i.e. Sub-application 1'). Preferably, each application and sub-application is depicted as a window.

In the examples described herein, Application 1 is an instant massaging application, Sub-application 1 is an instant massaging session between the user and Person 1 and Sub-application 2 is an instant massaging session between the user and Person 2. Application 2 is an e-mail application and Sub-application 1' is an e-mail session between the user and Person 1.

Preferably, the applications and sub-applications comprise associated entity data. For example, a sub-application that is a session between the user and another user, a computer system etc., comprises data associated with an identifier (e.g. instant message address, e-mail address) of the another user, the computer system etc.

According to the present invention, there is provided a proxy (110) comprising a focus component (115) for detecting focus of an entity. In a preferred embodiment, the focus component (115) is an event listener object implemented in Java (Java and all Java-based trademarks are trademarks of Sun Micro systems, Inc. in the United States, other countries, or both). Programs written in the Java programming language are generally run in a virtual machine environment, rather than directly on hardware. Thus a Java program is typically compiled into byte-code form, and then interpreted by the Java virtual machine (JAM) into hardware commands for the platform on which the JAM is executing. A JAM includes components necessary to load Java classes and execute software methods written in the Java programming language. Java classes are written by programmers in the Java programming language using Java instructions.

A software object, referred to as an object, is an instance of a software class represented as an encapsulated software component comprising data attributes and functionality. The functionality within a software class is defined by software methods that are executed at run-time. Software classes are developed to represent abstract components of an object-oriented software application.

An event listener is an object that is interested in receiving notifications regarding events (e.g. a mouse click, a button click etc.) from another object (known as an event source). For a particular event type (e.g. a mouse click), there is an associated event listener.

In the preferred embodiment, the focus component(115) is a focus listener. A focus listener is an event listener for focus event types, wherein a focus event is associated with focus. The focus events are focusLost (i.e. loss of focus) and focusGained (i.e. gain of focus).

The focus listener subscribes to a list of focus listeners associated with an event source (e.g. an object representing an application, a sub-application etc.) and by doing so, registers interest in receiving notifications regarding focus events associated with the event source. It should be understood that the focus listener can also un-subscribe from the list.

When a focus event associated with the event source is generated, the event source notifies a subscribed focus listener by calling a method on the focus listener and passes it a reference to a first event object, which provides context about the focus event. The focus listener can interrogate the first event object by calling methods on the first event object to get data (e.g. data regarding the event source, data regarding the focus event etc.).

The focus listener is associated with an intercept component (120) such that in response to a focus gain event, the focus listener can pass event source data to the intercept component (120). The intercept component (120) intercepts an input stream before transmission of the input stream to a focused entity.

In the preferred embodiment, the intercept component (120) is an event listener object implemented in Java, namely a key listener. A key listener is an event listener for key event types, wherein a key event is associated with one or more keys of a keyboard. The key events are key pressed (i.e. user press of a key), keyReleased (i.e. user release of a key) and keyTyped (i.e. user has typed a character).

The key listener subscribes to a list of key listeners associated with the event source that generated the focus gain event and by doing so, registers interest in receiving notifications regarding key events associated with the event source. It should be understood that the key listener can also un-subscribe from the list.

When a key event associated with the event source is generated, the event source calls a method on the key listener and passes it a reference to a second event object, which provides context about the key event. The key listener can interrogate the second event object by calling methods on the second event object to get data (e.g. data regarding tie event source, data regarding the key event etc.). The key listener is responsive to keyTyped events (wherein a user types one or more characters).

The intercept component (120) is confirmable to pass data (i.e. alphanumeric characters that have been typed) to a match component (125). Thus, the alphanumeric characters (which form an input stream from a user) are not sent to the event source but are intercepted and routed to the match component (125).

The match component (125) compares the input stream with one or more profiles, stored in a storage means (140). The profiles are associated with an application (and any associated sub-applications) and each profile stores profile data. The data is a set of textual data, for example, words, terms etc. (i.e. alphanumeric characters) derived from textual data of one or more input streams input to the application (and any associated sub-applications). A profile is created so that the textual data stored therein is associated with typical usage of an application and/or sub-application.

A preferred implementation of profile creation will now be described, wherein a data mining application is used. Firefly, one or more input streams input to each application (and any sub-applications) are logged. Next, preprocessing of the logged textual data is required in order to format the textual data so that is suitable for a data mining application to operate on.

For example, a simple lexicographic comparison of words will not recognize "member" and "members" as the same word (which are in different forms) and therefore cannot link them. For this reason it is necessary to transform all words to a "basic format" or canonical form.

Another difficulty is that a data mining application usually "reads" textual data word by word. Therefore, terms which are composed of several words are not regarded as an entity and furthermore, the individual words could have a different meaning from the entity. For example the words "Dire" and "Straits" are different in meaning to the entity "Dire Straits", whereby the entity represents the name of a music band. For this reason it is important to recognize words or terms which represent names, places etc. and also to recognize composed terms.

Another problem is caused by words such as "the", "and", "a" etc. These types of words occur frequently, however, the words contribute very little to information. Therefore it is reasonable to assume that the words could be removed with minimal impact on the information.

In standard data mining applications the problems described above are addressed by preprocessing textual data. Preprocessing provides a normalized (canonical) form to each of the extracted words, wherein a vocabulary of canonical forms and their variants is created. Preprocessing also provides a series of algorithms that can identify names of people(NAME), organizations (OREG) and places (PLACE); abbreviations; technical terms (TERM) and special single words (WORD). For example, some algorithms look for sequences of capitalized words and selected prepositions in the textual data and then considers them as candidates for names. Some algorithms also scan the textual data for sequences of words which show a certain grammatical structure and which occur at least twice. These sequences of words are either a multi-word noun phrase, consisting of a sequence of nouns and/or adjectives, ending in a noun, or two such strings joined by a single preposition.

Preprocessing also perform tasks, such as filtering stopwords (e.g. "and", "it", "a" etc.) on the basis of a pre defined list.

Once the textual data has been preprocessed, the textual data is mined for words and terms. Preferably, the words and terms are indexed by frequency of occurrence. Next, a profile is created by reading into the storage means (140), words and terms which occur in the textual data more often than a minimum frequency (whereby a user or a computer system may determine the minimum frequency). Setting a threshold for minimum frequency is advantageous in that it compensates for anomalies (e.g. typing errors) and also prevents storage of a large amount of redundant data (e.g. words or terms that occur only once).

It should be understood that the profile can also be created iteratively, in that as an input stream is received, the input stream is preprocessed, mined and resulting words and terms are added to the profile if appropriate (e.g. words and terms which occur in the textual data more often than a minimum frequency). The profile can also comprise additional data, such as a location of an executable of an application and/or sub-application on disk of the computer system (145).

Examples of profiles are shown below, wherein Profile 1 holds textual data associated with input streams to Application 1, Profile 1' holds textual data associated with input streams to Sub-application 1 and Profile 1" holds textual data associated with input streams to Sub-application 2. Profile 2 holds textual data associated with input streams to Application 2 and Profile 2' holds textual data associated with input streams to Sub-application 1'.

| Profile 1 | |
| --- | --- |
| Instantmessage.exe | run |
| Profile 1' | |
| Person1@instantmessage.com | alice; confidential; drawings; patent |
| Profile 1" | |
| Person2@instantmessage.com | bob; lunch; golf; tee |
| Profile 2 | |
| Email.exe | execute |
| Profile 2' | |
| Person1@email.com | drawings; patent |

The proxy (110) also comprises a transmission component (130), responsive to the match component (125) for transmitting the input stream to an application or sub-application.

Figure 2B:
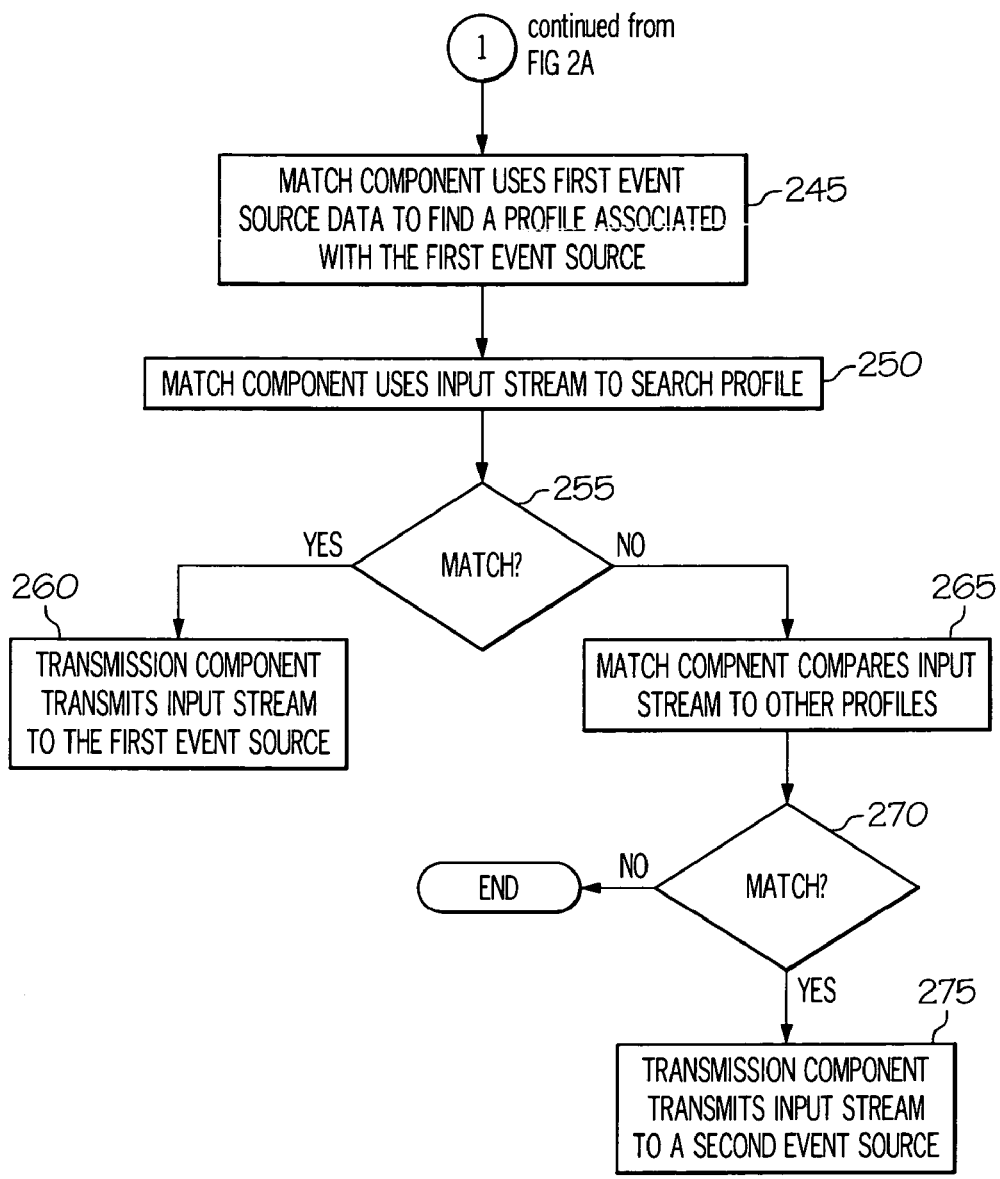

A process according to a first embodiment will now be described with reference to FIGS. 1 and 2, wherein the focus component (115) is a focus listener and subscribes to a list associated with at least one entity (i.e. an event source), in order to receive notifications regarding focus events. In the preferred embodiment, the focus listener subscribes to a list associated with each entity (i.e. applications and sub-applications) of the computer system (145).

In a first example, a focus gained event is generated (step 200) by an object representing Sub-application 1, which is an instant massaging session between the user and Person 1. The event source (i.e. the object representing Sub-application 1) calls a focus gained method on the focus listener and passes a reference to a first event object to the focus listener. The focus listener interrogates the first event object by calling one or more methods on the first event object to get (step 205) data.

In the first example, the data is associated with the event source and comprises an instant message address of Person 1. The data is also associated with the event type has been generated and comprises the particular event that has been generated (i.e. a focus gain event).

In response to a focus gain event, the focus listener passes (step 210) the event source data (i.e. instant message address of Person 1) to the intercept component (120), which is a key listener.

In response to receiving the event source data, the key listener subscribes to a list associated with the event source, in order to receive notifications regarding key events. It should be understood that in an alternative embodiment, the key listener can subscribe to a list associated with each entity (i.e. applications and sub-applications) of the computer system (145) before the process of FIG. 2 is executed.

In the first example, a keyTyped event is generated (step 215) by the event source. The event source calls a keyTyped method on the key listener and passes a reference to a second event object to the key listener. The key listener interrogates the second event object by calling one or more methods on the second event object to get (step 220) data. In this example, the data is associated with the event type and comprises a particular character that has been typed.

Next the process passes to step 225, wherein a determination is made as to whether a terminator character (e.g. a return key) has been typed. A terminator character terminates the input of an input stream.

In response to a positive result, the process passes to step 240, which will be described later. It should be understood that on a first execution of the process, if a terminator character results from a first keyTyped event there are no preceding characters in a store associated with the key listener. Thus, the key listener does nothing and waits for another keyTyped event that results in an alphanumeric character.

In response to a negative result, the process passes to step 230, wherein the key listener stores the character that has been typed in its associated store. The process then passes to step 235, wherein a determination is made as to whether any more keyTyped events have been generated.

In response to a positive result, the process passes back to step 220, until a terminator character is pressed, after which the process passes to step 240. In response to a negative result from step 235, the process passes to step 240.

At step 240, the key listener reads the characters in its store and passes the characters (i.e. an input stream) to the match component (125) as well as the event source data (i.e. instant message address of Person 1).

In this example, the input stream is "Hello, I have done some work on my patent application". It should be understood that the input stream can be preprocessed (e.g. removal of stop words etc.) before being transmitted to the match component (125).

The match component (125) uses the instant message address of Person 1 received from the key listener to search (step 245) the storage means (140) for a profile associated with the instant message address, which in this case is Profile 1'. Next, at step 250, the match component (125) uses the input stream received from the key listener to search Profile 1', in order to match input data in the input stream to profile data in a profile associated with the focused entity. At step 255, a determination is made as to whether textual data in the input stream matches at least part of a set of textual data in Profile 1'. The term "match" herein should be understood by a person skilled in the art to mean exact match, partial match, equivalents or any other match without departing from the scope of the invention.

In this example, a match occurs for the word "patent" and the process passes to step 260, wherein the transmission component (130) transmits the input stream to Sub-application 1.

In a second example, a user can select an alternative entity to a currently focused entity, to which an input stream is transmitted to. As described previously, the focus listener subscribes to a list associated with at least one entity.

In the second example, a focus gained event is generated (step 200) by an object representing Sub-application 2, which is an instant massaging session between the user and Person 2. The event source (i.e. the object representing Sub-application 2) calls a focus gained method on the focus listener and passes a reference to a third event object to the focus listener. The focus listener interrogates the third event object by calling one or more methods on the third event object to get (step 205) data.

In the second example, the data is associated with the event source and comprises an instant message address of Person 2. The data is also associated with the event type has been generated and comprises the particular event that has been generated (i.e. a focus gain event).

In response to a focus gain event, the focus listener passes (step 210) the event source data (i.e. instant message address of Person 2) to the key listener. In response to receiving the event source data, the key listener subscribes to a list associated with the event source.

In the second example, a keyTyped event is generated (step 215) by the event source. The event source calls a keyTyped method on the key listener and passes a reference to a fourth event object to the key listener. The key listener interrogates the fourth event object by calling one or more methods on the fourth event object to get (step 220) data. In this example, the data is associated with the event type and comprises a particular character that has been typed.

Next the process passes to step 225, wherein a determination is made as to whether a terminator character (e.g. a return key) has been typed. In response to a positive result, the process passes to step 240. In response to a negative result, the process passes to step 230, wherein the key listener stores the character that has been typed in its associated store. The process then passes to step 235, wherein a determination is made as to whether any more keyTyped events have been generated. In response to a positive result, the process passes back to step 220, until a terminator character is pressed, after which the process passes to step 240. In response to a negative result from step 235, the process passes to step 240.

At step 240, the key listener reads the characters in its store and passes the characters (i.e. an input stream) to the match component (125) as well as the event source data (i.e. instant message address of Person 2). In this example, the input stream is "I will send you the patent application work".

The match component (125) uses the instant message address of Person 2 received from the key listener to search (step 245) the storage means (140) for a profile associated with the instant message address, which in this case is Profile 1". Next, at step 250, the match component (125) uses the input stream received from the key listener to search Profile 1". At step 255, a determination is made as to whether textual data in the input stream matches at least part of a set of textual data in Profile 1".

In this example, no match occurs, causing the process to pass to step 265, wherein the match component (125) is re-executed to match the input stream against other profiles and sub-profiles in the storage means (140) (,i.e. Profile 1, Profile 1', Profile 2 and Profile 2'). At step 270, a determination is made as to whether textual data in the input stream matches at least part of a set of textual data in at least one other profile. In response to a negative result, the process ends.

In this example, a match occurs (positive result to step 270) for the word "patent" with Profile 1' and Profile 2'. In response to a match being found, the(transmission component (130) sends a notification to the user. In this example, the notification notifies the user that a match has not occurred with Profile 1", but that a match has occurred with Profile 1' and Profile 2'. Preferably, notification also requests the user for input as to how to proceed, by presenting one or more options (represented by keying #1, #2 or #3) to the user. An example of a notification is shown below:

<notification>
 <input_stream> "I will send you the patent application work" </input_ stream>
  <result> Match for Profile 1" (person2@instantmessage.com) has
  not occurred </result>
  <result> Match for Profile 1' (person1@instantmessage.com) and

```
    Profile 2' (person1@email.com) has occurred </result>
        <action> Please select one of the following options by
        pressing the appropriate numerical key on your input device
        # 1-> "Transmit input to (person1@instantmessage.com)"
        # 2-> "Transmit input to (person1@email.com)"
        # 3-> "End transmission" </action>
</notification>
```

The transmission component (130) is confirmable to receive a selection of an option from the user. In this example, in response to a selection of #1 or #2, if not executing already Sub-application 1 (i.e. an instant message session between the user and Person 1) or Sub-application 1' (i.e. an email session between the user and Person 1) are executed by an executing component (not shown) for example, by using the location data stored in the associated profile. Next, the transmission component (130) transmits (step 275) the input stream to Sub-application 1 or Sub-application 1' respectively. In this example, in response to a selection of #3, the process ends.

Advantageously, if a user is inadvertently transmitting an input stream to a focused entity (i.e. Sub-application 2) that is inappropriate for the input stream, the present invention presents options associated with one or more other entities, allowing the user to choose a more appropriate entity (e g. Sub-application 1 or Sub-application 1') to which the input stream is routed to.

Figure 3A:
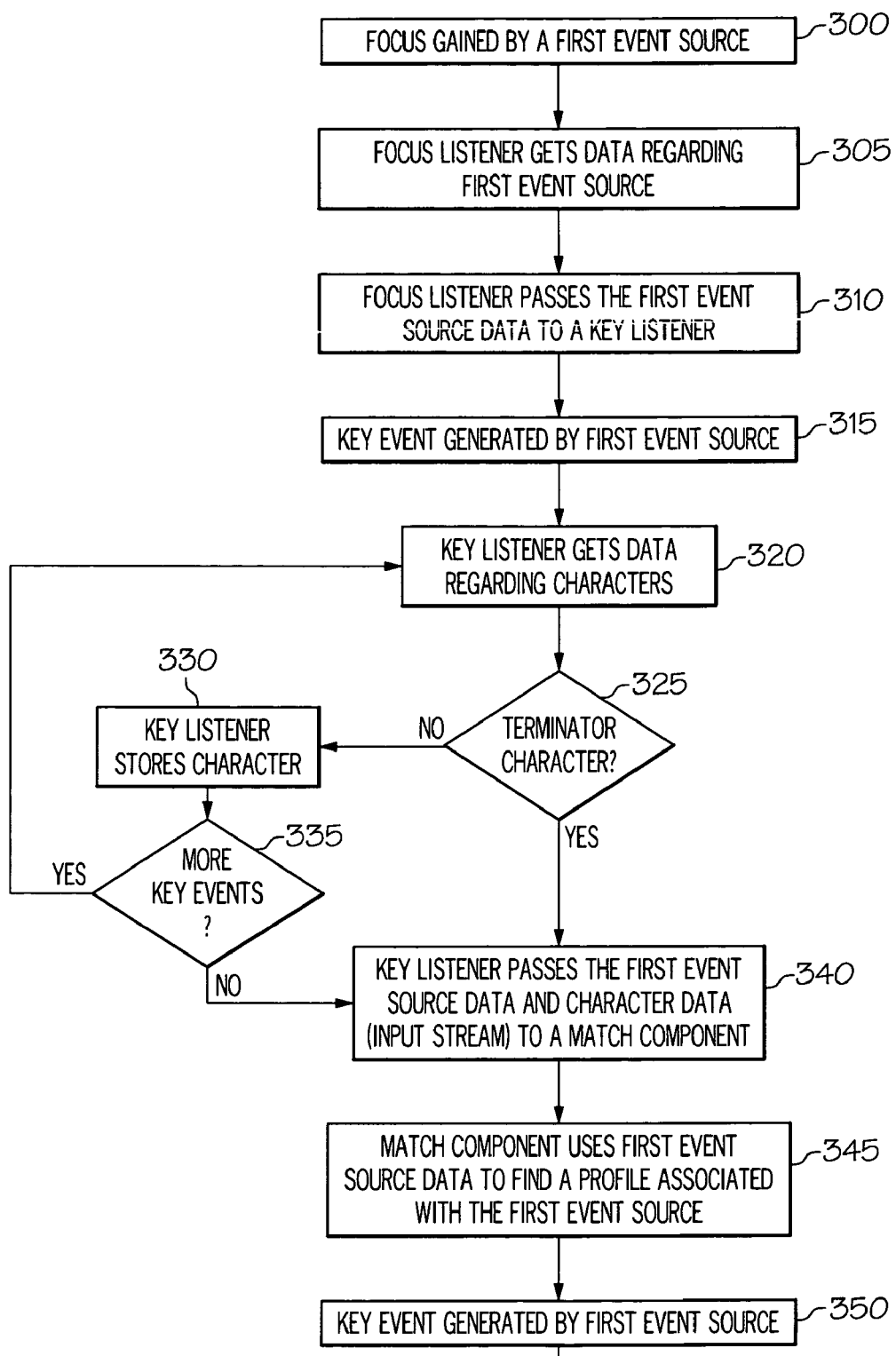
FIG. 3 is a flow chart showing the operational steps involved in a process of a second embodiment.
Figure 3B:
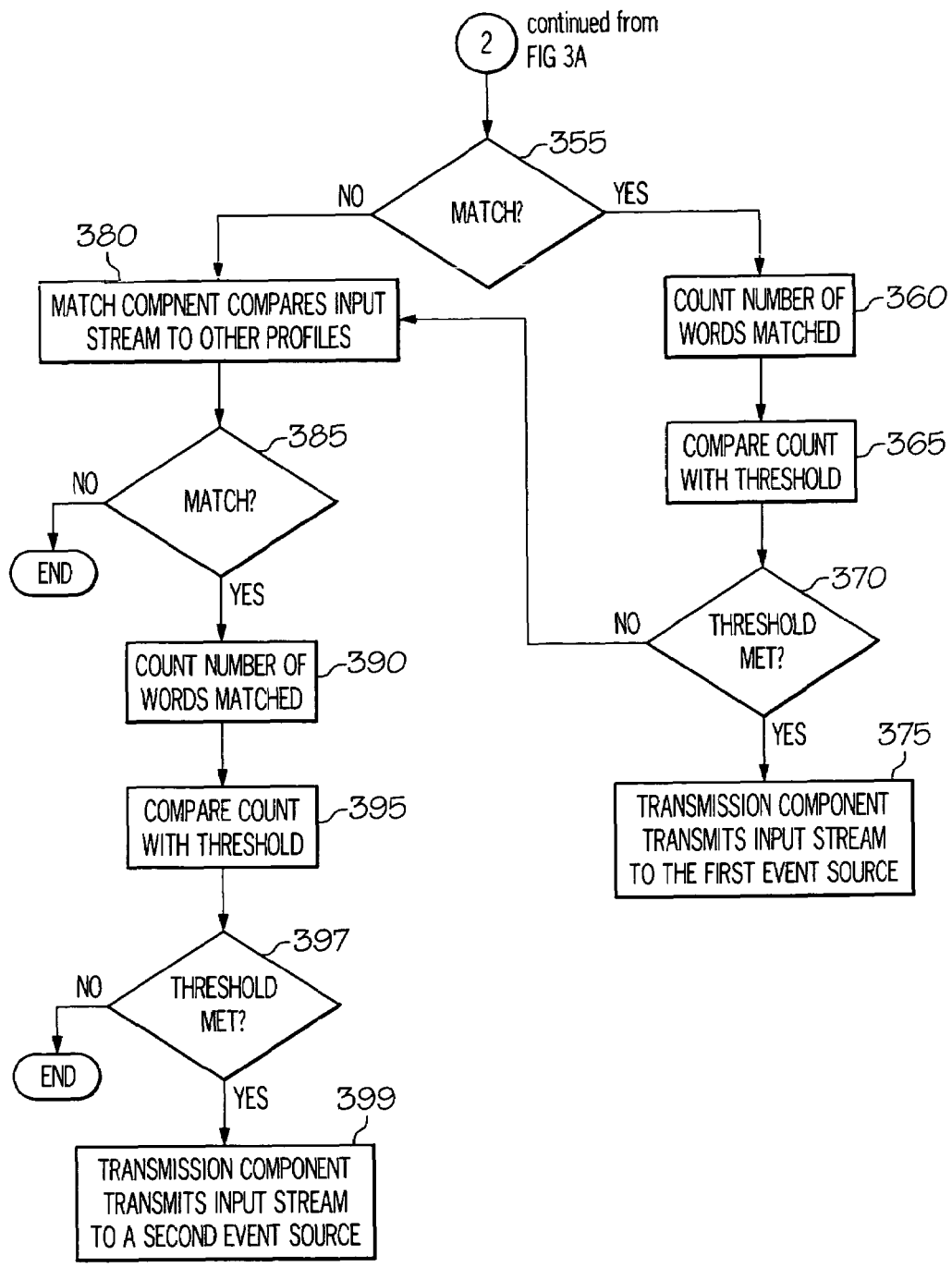

A process according to a second embodiment will now be described with reference to FIG. 1 and FIG. 3, wherein automated selection of an alternative entity to a currently focused entity, to which an input stream is transmitted to, occurs. As described previously, the focus component (115) is a focus listener and subscribes to a list associated with at least one entity.

In a third example, a focus gain event is generated (step 300) by an object representing Sub-application 1', which is an email session between the user and Person 1. The event source (i.e. the object representing Sub-application 1') calls a focus gained method on the focus listener and passes a reference to a fifth event object to the focus listener. The focus listener interrogates the fifth event object by calling one or more methods on the fifth event object to get (step 305) data.

In the third example the data is associated with the event source and comprises an email address of Person 1. The data is also associated with the event type has been generated and comprises the particular event that has been generated (i.e. a focus gain event).

In response to a focus gain event, the focus listener passes (step 210) the event source data (i.e. email address of Person 1) to the key listener. In response to receiving the event source data, the key listener subscribes to a list associated with the event source.

In the third example, a keyTyped event is generated (step 315) by the event source. The event source calls a keyTyped method on the key listener and passes a reference to a sixth event object to the key listener. The key listener interrogates the sixth event object by calling one or more methods on the sixth event object to get (step 320) data. In this example, the data is associated with the event type and comprises a particular character that has been typed.

Next the process passes to step 325, wherein a determination is made as to whether a terminator character (e.g. a return key) has been typed. In response to a positive result, the process passes to step 340. In response to a negative result, the process passes to step 330, wherein the key listener stores the character that has been typed in its associated store. The process then passes to step 335, wherein a determination is made as to whether any more keyTyped events have been generated. In response to a positive result, the process passes back to step 320, until a terminator character is pressed, after which the process passes to step 340. In response to a negative result from step 335, the process passes to step 340.

At step 340, the key listener reads the characters in its store and passes the characters (i.e. an input stream) to the match component (125) as well as the event source data (i.e. email address of Person 1). In this example, the input stream is "Attached below are the drawings for my patent application and I have marked them confidential".

The match component (125) uses the email address of Person 1 received from the key listener to search (step 345) the storage means (140) for a profile associated with the instant message address, which in this case is Profile 2'. Next, at step 350, the match component (125) uses the input stream received from the key listener to search Profile 2'. At step 355, a determination is made as to whether textual data in the input stream matches at least part of a set of textual data in Profile 2'.

In the third example, a match does occur for the words "drawings" and "patents" and the process passes to step 360, wherein a count component counts the number of words that matched. In this example, the number has a value of two. A comparator compares (step 365) the value against a preset threshold (e.g. a threshold that is set by a user or a computer system) representing a minimum number of words present in the input stream. In this example, the threshold is three. A determination (step 370) is made as to whether the value meets the threshold. If the value meets the threshold, the process passes to step 375 wherein the transmission component (130) transmits the input stream to Sub-application 1'.

In the third example, the value does not meet the threshold and the process passes to step 380, wherein the match component (125) is re-executed, to match the input stream against other profiles and sub-profiles in the storage means (140) (i.e. Profile 1, Profile 1', Profile 1" and Profile 2). At step 385, a determination is made as to whether textual data in the input stream matches at least part of a set of textual data in at least one other profile. In response to a negative result, the process ends.

In this example, a match occurs (positive result to step 385) for the words "drawings", "confidential" and "patent" with Profile 1'. The process passes to step 390, wherein the count component counts the number of words that matched. In this example, the number has a value of three. The comparator compares (step 395) the value against the preset threshold and a determination (step 397) is made as to whether the value meets the threshold. In this example, the value meets the threshold and the process passes to step 399, wherein the transmission component (130) transmits the input stream to the Sub-application 1. If the value does not meet the threshold (negative result to step 397), the process ends. Alternatively, a user can choose to send the input stream to an entity.

Advantageously, the present invention can be used in many applications. For example, in an environment requiring high security, wherein transmission of information to an incorrect recipient (e.g. another user outside the environment or even to another user in a sub-environment of the environment) is undesirable, the present invention allows for a "proxy" between the user and an entity, so that transmission of information to an incorrect recipient is prevented.

In another example, a new user of a computer system comprising several entities (e.g. multiple applications, multiple processes etc.) can inadvertently send information to an incorrect entity. For example, a command that invokes a directory listing for a first application can be sent to a second application by mistake. Advantageously, the present invention provides a form of training to the new user, by suggesting alternative, more appropriate entities for user input.

The invention claimed is:

1. A system for transmitting an input stream for use with an apparatus comprising a plurality of entities, wherein each entity comprises an associated entity profile having associated profile data, the system comprising:
    a focus component for detecting focus of a first entity;
    an intercept component for intercepting the input stream having input data, before the input stream is input to the focused first entity;
    a match component for matching the input data with first profile data associated with the focused first entity, and in response to the input data not matching the first profile data, matching by the match component the input data with second profile data of a second entity profile associated with a second entity; and
    a transmission component, responsive to the input data matching the second profile data, for transmitting the input stream to the second entity.

2. The system of claim 1, wherein the transmission component transmits, before transmitting the input stream to the second entity, a notification to an administrator comprising an option associated with selection of the second entity.

3. The system of claim 2, wherein in response to receiving a selection of the second entity, the transmission component transmits the input stream to the second entity.

4. The system of claim 1, further comprising a count component, responsive to the input data matching the second profile data, for counting a number of sets of input data that match corresponding sets of second profile data.

5. The system of claim 4, further comprising a comparator for comparing a value of the number with a threshold, wherein the transmission component transmits the input stream to the second entity if the threshold is met.

6. A method for transmitting an input stream for use with an apparatus comprising a plurality of entities, wherein each entity comprises an associated entity profile having associated profile data, the method comprising:
    detecting focus of a first entity;
    intercepting the input stream having input data, before the input stream is input to the focused first entity;
    matching the input data with first profile data associated with the focused first entity, and in response to the input data not matching the first profile data, matching the input data with second profile data of a second entity profile associated with a second entity; and
    in response to the input data matching the second profile data, transmitting the input stream to the second entity.

7. The method of claims 6, further comprising: transmitting, before transmission of the input stream to the second entity, a notification to an administrator comprising an option associated with selection of the second entity.

8. The method of claim 7, wherein the input stream is transmitted to the second entity in response to receiving a selection of the second entity.

9. The method of claim 6, further comprising: in response to the input data matching the second profile data, counting a number of sets of input data that match corresponding sets of second profile data.

10. The method of claim 9, further comprising: comparing a value of the number with a threshold, wherein the input stream is transmitted to the second entity if the threshold is met.

11. The method of claim 6, further comprising: generating an entity profile from one or more input streams input to the associated entity.

12. A computer-usable medium embodying computer program code, the computer program code for use with an apparatus comprising a plurality of entities, wherein each entity comprises an associated entity profile having associated profile data the computer program code comprising computer executable instructions configured for:
    detecting focus of a first entity;
    intercepting input data, before the input data is input to the focused first entity;
    matching the input data with first profile data associated with the focused first entity, and in response to the input data not matching the first profile data, matching the input data with second profile data of a second entity profile associated with a second entity; and
    in response to the input data matching the second profile data, transmitting the input stream to the second entity.

13. The computer-usable medium of claim 12, wherein the embodied computer program code further comprises computer executable instructions configured for transmitting, before transmission of the input data to the second entity, a notification to an administrator comprising an option associated with selection of the second entity.

14. The computer-usable medium of claim 13, wherein the input data is transmitted to the second entity in response to receiving a selection of the second entity.

15. The computer-usable medium of claim 12, wherein the embodied computer program code further comprises computer executable instructions configured for, in response to the input data matching the second profile data, counting a number of sets of input data that match corresponding sets of second profile data.

16. The computer-usable medium of claim 15, wherein the embodied computer program code further comprises computer executable instructions configured for comparing a value of the number with a threshold, wherein the input data is transmitted to the second entity if the threshold is met.

17. The computer-usable medium of claim 12, wherein the embodied computer program code further comprises computer executable instructions configured for generating an entity profile from one or more input data streams input to the associated entity.

* * * * *